United States Patent
Brehm et al.

(10) Patent No.: US 10,920,369 B2
(45) Date of Patent: Feb. 16, 2021

(54) DISPERSIONS OF β-KETOCARBONYL-FUNCTIONAL ORGANOSILICON COMPOUNDS

(71) Applicant: WACKER CHEMIE AG, Munich (DE)

(72) Inventors: Christof Brehm, Burghausen (DE); Anton Heller, Simbach (DE); Elisabeth Hoelzlwimmer, Simbach (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 16/461,035

(22) PCT Filed: Nov. 16, 2016

(86) PCT No.: PCT/EP2016/077842
§ 371 (c)(1),
(2) Date: May 15, 2019

(87) PCT Pub. No.: WO2018/091078
PCT Pub. Date: May 24, 2018

(65) Prior Publication Data
US 2019/0309468 A1 Oct. 10, 2019

(51) Int. Cl.
| D06M 15/643 | (2006.01) |
| C08G 77/388 | (2006.01) |
| C09D 183/06 | (2006.01) |
| C09D 183/08 | (2006.01) |
| C08G 77/26 | (2006.01) |
| C08G 77/14 | (2006.01) |
| C08G 77/28 | (2006.01) |

(52) U.S. Cl.
CPC ....... *D06M 15/6433* (2013.01); *C08G 77/388* (2013.01); *C09D 183/06* (2013.01); *C09D 183/08* (2013.01); *C08G 77/14* (2013.01); *C08G 77/26* (2013.01); *C08G 77/28* (2013.01)

(58) Field of Classification Search
CPC ... D06M 15/6433; C08G 77/14; C08G 77/26; C08G 77/28; C08G 77/388; C09D 183/06; C09D 183/08
See application file for complete search history.

(56) References Cited

U.S. PATENT DOCUMENTS

| 7,083,672 | B2 * | 8/2006 | Wagh | A61K 6/802 |
| | | | | 106/35 |
| 7,495,119 | B2 * | 2/2009 | Herzig | C07F 7/0889 |
| | | | | 556/419 |
| 7,939,619 | B2 * | 5/2011 | Herzig | C08G 77/388 |
| | | | | 525/474 |
| 8,114,950 | B2 * | 2/2012 | Herzig | C08G 77/38 |
| | | | | 433/214 |
| 8,115,025 | B2 * | 2/2012 | Herzig | C07F 7/0889 |
| | | | | 556/413 |
| 9,968,866 | B2 * | 5/2018 | Brehm | B01D 19/0409 |
| 2002/0049296 | A1 | 4/2002 | Schafer et al. | |
| 2005/0215806 | A1 | 9/2005 | Heller et al. | |
| 2007/0260081 | A1 * | 11/2007 | Herzig | C07F 7/0889 |
| | | | | 556/419 |
| 2008/0293907 | A1 | 11/2008 | Herzig et al. | |
| 2009/0144912 | A1 | 6/2009 | Herzig et al. | |
| 2009/0197081 | A1 * | 8/2009 | Herzig | C08L 83/06 |
| | | | | 428/365 |
| 2009/0260769 | A1 * | 10/2009 | Herzig | C08G 77/46 |
| | | | | 162/164.4 |
| 2011/0024679 | A1 | 2/2011 | Herzig | |
| 2015/0112092 | A1 | 4/2015 | Fritz-Langhals | |
| 2016/0121239 | A1 | 5/2016 | Brehm et al. | |
| 2019/0345292 | A1 * | 11/2019 | Heller | C08G 77/388 |

FOREIGN PATENT DOCUMENTS

| CN | 103614910 A | 3/2014 | |
| DE | 102005056050 A1 | 5/2007 | |
| JP | 2004528491 A | 9/2004 | |
| JP | 2009121012 A | 6/2009 | |
| WO | 02076731 A1 | 10/2002 | |
| WO | WO-2007060089 A2 * | 5/2007 | ........... C08G 77/388 |

OTHER PUBLICATIONS

"Hans-Dieter Dörfler, Grenzflächen-und Kolloidchemie, VCH, Weinheim, 1994, S. 198" and English Abstract.
"Ullmann's Encyclopedia of Industrial Chemistry, CD-ROM-Ausgabe 2003, Wiley-VCH Verlag, „Emulsions".
IKA Dispergierer Broschüre, May, 2013.
Römpp, Thieme, Chemie Lexikon online, 2014, "Dissolver" and English Abstract.
VWR Laborkatalog, 2011-2013 S. 645.8 (only available in Germany).
G. Engelhardt, H. Jancke; J. Organometal. Chem. 28 (1971), 293-300 And English Summary.
Chapter 8—"NMR spectroscopy of organosilicon compounds", Elizabeth A. Williams, The Chemistry of Organic Silicon Compounds, 1989 John Wiley and Sons Ltd, 511-533.

* cited by examiner

*Primary Examiner* — Anthony J Green
(74) *Attorney, Agent, or Firm* — Brooks Kushman P.C.

(57) ABSTRACT

Storage stable aqueous dispersions of β-ketocarbonyl functional organosilicon compounds are prepared using a nonionic emulsifier having an HLB of less than 15. The compositions are suitable for treating textiles.

21 Claims, No Drawings

DISPERSIONS OF β-KETOCARBONYL-FUNCTIONAL ORGANOSILICON COMPOUNDS

CROSS REFERENCE TO RELATED APPLICATIONS

This application is the U.S. National Phase of PCT Appln. No. PCT/EP2016/077842 filed Nov. 16, 2016, the disclosure of which is incorporated in its entirety by reference herein.

BACKGROUND OF THE INVENTION

1. Field of the Invention

The invention relates to aqueous dispersions comprising β-ketocarbonyl-functional organosilicon compounds.

2. Description of the Related Art

Reaction products of amino-functionalized organosilicon compounds with diketenes are referred to as β-ketocarbonyl-functional organosilicon compounds. Compounds of this kind have been known for a long time.

For instance, US 2008/0293907 A1 describes a process for preparing β-ketocarbonyl-functional organosilicon compounds wherein diketene is reacted with organosilicon compounds containing amino groups. Oils are obtained.

US 2011/0024679 A1 describes waxlike β-ketocarbonyl-functional organosilicon compounds which are obtained by reaction of α,ω-aminopropyl-terminated organosilicon compounds with alkylketene dimers. The alkyl groups are relatively long-chain $C_{14}/C_{16}$-alkyl radicals. These waxlike β-ketocarbonyl-functional organosilicon compounds are dissolved in silicone oils of low viscosity, such as in dimethylpolysiloxane having trimethylsiloxane end groups and a viscosity of 35 $mm^2/s$ (25° C.), in respect of which they achieve "gelling" and find application, in particular, in cosmetics.

US 2016/0121239 A1 describes a method for defoaming and/or for preventing foaming of aqueous, surfactant-containing compositions by adding defoamer formulations, where the defoamer formulations described comprise waxlike β-ketocarbonyl-functional organosilicon compounds. These compounds were obtained by reaction of amino-functionalized organosilicon compounds with alkylketene dimer, the alkyl groups likewise being relatively long-chain $C_{14}/C_{16}$ alkyl radicals.

US 2009/0144912 A1 describes a method for treating proteinaceous, fiberlike fabrics, especially leather, with β-ketocarbonyl-functional organosilicon compounds. The β-ketocarbonyl-functional organosilicon compounds used are exclusively reaction products of amino-functionalized organosilicon compounds with diketene; hence without relatively long-chain alkyl radicals. Application in that case is made in the form of solutions in white spirit or isopropanol. While application in the form of dispersions is mentioned, possible emulsifiers identified are exclusively anionic esters or amides, such as ethoxylated phosphoric esters, sarcosides or sulfosuccinates. Emulsification of β-ketocarbonyl-functional organosilicon compounds having relatively long-chain alkyl radicals is not possible with these emulsifiers.

An object of the invention, therefore, was to provide aqueous formulations of β-ketocarbonyl-functional organosilicon compounds having relatively long-chain alkyl radicals that possess sufficient storage stability, can be combined with aqueous formulations of amino-containing organosilicon compounds, and can be used for hydrophobizing textile fibers and fabrics.

The object is achieved by the invention.

SUMMARY OF THE INVENTION

The invention is directed to aqueous dispersions comprising
(A) β-ketocarbonyl-functional organosilicon compounds which comprise at least one Si-bonded radical A of the general formula $$(Si)-L^1-[X^1-L^2-]_y X^2 \qquad (I)$$

where
 $L^1$ is identical or different and is a divalent, Si—C-bonded hydrocarbon radical having 1 to 18 carbon atoms,
 $L^2$ is identical or different and is a divalent hydrocarbon radical having 1 to 6 carbon atoms,
 $X^1$ is a radical of the formula —O—, —NZ—, —$NR^2$— or —S—, preferably —NZ—,
 $X^2$ is a radical of the formula —O—Z, —NH—Z, —$NR^2$—Z, —S—Z, preferably —NH—Z,
 Z is a radical of the formula —C(=O)—$CHR^3$—C(=O)—$CH_2R^3$,
 $R^2$ is a monovalent hydrocarbon radical having 1 to 18 carbon atoms,
 $R^3$ is a monovalent, optionally substituted hydrocarbon radical having at least 12 carbon atoms, preferably having at least 14 carbon atoms,
 y is 0, 1, 2 or 3, preferably 0 or 1, more preferably 0, and
 (Si)— denotes the bond to the Si atom,
(B1) at least one nonionic emulsifier having an HLB of not more than 15, and
(C) water.

DETAILED DESCRIPTION OF THE PREFERRED EMBODIMENTS

The aqueous dispersions of the invention may further optionally comprise one or more of
(B2) at least one further nonionic emulsifier having an HLB of greater than 15, and/or
(B3) at least one anionic emulsifier. Combinations of the emulsifiers (B1) with (B2)
or (B1) with (B3)
or combinations of the emulsifiers (B1), (B2), and (B3) are therefore possible.

Where further emulsifiers (B2) or (B3) are present, the ratio of the nonionic emulsifiers (B1) to other nonionic emulsifiers (B2) or anionic emulsifiers (B3) is not less than 1:10, preferably not less than 1:8, more preferably not less than 1:6, and not more than 10:1, preferably not more than 5:1, more preferably not more than 4:1, based in each case on the weight of the emulsifiers (B1), (B2), and (B3).

Furthermore, the aqueous dispersions of the invention may optionally comprise
(B4) cationic emulsifiers.
A combination of the emulsifiers (B1) with (B4)
or (B1) with (B2) and (B4)
or (B1) with (B3) and (B4)
or (B1) with (B2), (B3), and (B4) is therefore possible.

The aqueous dispersions of the invention preferably comprise at least 5 wt %, more preferably at least 10 wt %, and preferably at most 70.0 wt %, more preferably at most 50 wt %, and most preferably at most 40 wt %, of β-ketocarbonyl-functional organosilicon compounds (A).

The aqueous dispersions of the invention preferably comprise at least 1 part by weight, more preferably at least 2 parts by weight, and preferably at most 25 parts by weight, more preferably at most 20 parts by weight, and most preferably at most 15 parts by weight, of emulsifier (B1), based in each case on 100 parts by weight of the β-ketocarbonyl-functional organosilicon compounds (A).

In the event of further emulsifiers (B2) and/or (B3) and/or (B4) being present, the aqueous dispersions of the invention preferably comprise at least 1 part by weight, more preferably at least 2 parts by weight, and most preferably at least 4 parts by weight, and preferably at most 25 parts by weight, more preferably at most 20 parts by weight, and most preferably at most 15 parts by weight, of emulsifiers (B2) and/or (B3) and/or (B4) in total, based in each case on 100 parts by weight of the β-ketocarbonyl-functional organosilicon compounds (A).

The aqueous dispersions of the invention preferably comprise at least 1 wt %, more preferably at least 5 wt %, most preferably at least 10 wt %, and preferably at most 94.5 wt %, and most preferably at most 85 wt %, more particularly at most 80 wt %, of water (C).

The aqueous dispersions of the invention may optionally comprise further ingredients.

Examples of further ingredients are (D) nonaqueous solvents or coemulsifiers and (E) auxiliaries selected from the group of pH regulators, salts, foam inhibitors, thickeners, protective colloids, preservatives, disinfectants, wetting agents, corrosion inhibitors, dyes, fragrances, and mixtures thereof.

The aqueous dispersions of the invention preferably have particle sizes (D50) of not more than 0.8 μm, more preferably not more than 0.6 μm, and most preferably not more than 0.4 μm.

The aqueous dispersions in the sense of the invention are substance mixtures consisting of two or more phases. In these systems, one substance, referred to as the disperse phase—in the case of the present invention, then, the β-ketocarbonyl-functional organosilicon compound (A)—is present in extremely fine distribution within another substance, the dispersion medium—in the case of the present invention, then, in water (C) and, optionally, nonaqueous solvent (D). Where the disperse phase, i.e., the β-ketocarbonyl-functional organosilicon compound (A), is a liquid, the aqueous dispersion is also referred to as an aqueous emulsion. Where the disperse phase, i.e., the β-ketocarbonyl-functional organosilicon compound (A), is a solid, the aqueous dispersion is also referred to as an aqueous suspension.

The β-ketocarbonyl-functional organosilicon compounds (A) used in the aqueous dispersions of the invention may be oligomeric or polymeric organosiloxanes, preferably organopolysiloxanes. They preferably contain at least 3, more preferably at least 5, and most preferably at least 10 Si atoms, and preferably up to 2000 Si atoms, more preferably up to 1000 Si atoms, and most preferably up to 700 Si atoms.

Preferred for use as β-ketocarbonyl-functional organosilicon compounds (A) are organopolysiloxanes consisting of units of the general formula

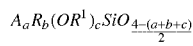  (II)

where

A is a radical of the formula (I),

R is a monovalent, optionally substituted hydrocarbon radical having 1 to 18 carbon atoms per radical, R" is a hydrogen atom or an alkyl radical having 1 to 8 carbon atoms, a is 0 or 1 b is 0, 1, 2 or 3, and c is 0 or 1, with the proviso that the sum a+b+c is not more than 3 and there is on average at least one radical A per molecule.

Preferred as β-ketocarbonyl-functional organosilicon compounds (A) are organopolysiloxanes of the general formula

  (III), where

A is a radical of the formula (I), $R^4$ is identical or different and is a radical R or OR', R and R" have the definition stated for them above, d is 0 or 1, e is 0 or an integer from 1 to 2000, and f is 0 or an integer from 1 to 20, with the proviso that there is on average at least one radical A per molecule, meaning that, respectively, if d is 0, f is not 0, and if f is 0, d is 1.

The β-ketocarbonyl-functional organosilicon compounds (A) used in the composition of the invention may be waxlike solids or liquids. In the latter case they preferably have a viscosity of 1 to 1,000,000 mPa·s at 25° C., more preferably 100 to 50,000 mPa·s at 25° C.

The β-ketocarbonyl-functional organosilicon compounds (A) used are known and are described in US 2011/0024679 A1 and/or US 2016/0121239 A1 (herein incorporated by reference), including their preparation.

The β-ketocarbonyl-functional organosilicon compounds (A) used are preferably prepared by reaction of organosilicon compounds (1) having at least one radical B of the general formula $(Si)-L^1-[X^3-L^2-]_y X^4$  (IV)

with diketenes (2) of the general formula

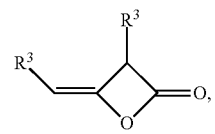  (V)

where $X^3$ is a radical of the formula —O—, —NH—, —NR²— or —S—, preferably —NH—, $X^4$ is a radical of the formula —OH, —NH₂, —NR²H or —SH, preferably —NH₂, $R^2$, $R^3$, $L^1$, $L^2$, y, and (Si) have the definition stated for them above.

Preferred for use as organosilicon compounds (1) are organopolysiloxanes consisting of units of the general formula

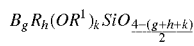  (VI)

where
B is a radical of the formula (IV),
R is a monovalent, optionally substituted hydrocarbon radical having 1 to 18 carbon atoms per radical,
$R^1$ is a hydrogen atom or an alkyl radical having 1 to 8 carbon atoms,
g is 0 or 1,
h is 0, 1, 2 or 3, and
k is 0 or 1,
with the proviso that the sum g+h+k is not more than 3 and there is on average at least one radical B per molecule.

Preferred examples of organosilicon compounds (1) are organopolysiloxanes of the general formula $$B_l R^4_{(3-l)} SiO(SiR_2 O)_m (SiR^4 BO)_n SiR^4_{(3-l)} B_l \qquad (VII),$$

where
B is a radical of the formula (IV),
$R^4$ is identical or different and is a radical R or OR',
R and $R^1$ have the definition stated for them above,
l is 0 or 1,
m is 0 or an integer from 1 to 2000, and
n is 0 or an integer from 1 to 20,
with the proviso that there is on average at least one radical B per molecule, meaning that, respectively,
if l is 0, n is not 0, and
if n is 0, l is 1.

The organosilicon compounds (1) used preferably have a viscosity of 1 to 1,000,000 mPa·s at 25° C., more preferably 100 to 50,000 mPa·s at 25° C.

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; cycloalkyl radicals such as the cyclopentyl, cyclohexyl, cycloheptyl, and methylcyclohexyl radicals; alkenyl radicals such as the vinyl, 5-hexenyl, cyclohexenyl, 1-propenyl, allyl, 3-butenyl, and 4-pentenyl radicals; alkynyl radicals such as the ethynyl, propargyl, and 1-propynyl radicals; aryl radicals such as the phenyl, naphthyl, anthryl, and phenanthryl radicals; alkaryl radicals such as the o-, m-, and p-tolyl radicals, xylyl radicals, and ethylphenyl radicals; and aralkyl radicals, such as the benzyl radical, and the α- and the β-phenylethyl radicals.

Preferred examples of radicals R are the methyl radical or the ethyl radical.

Examples of radicals $R^1$ are hydrogen, or alkyl radicals such as the methyl, ethyl, n-propyl, isopropyl, 1-n-butyl, 2-n-butyl, isobutyl, tert-butyl, n-pentyl, isopentyl, neopentyl, or tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical.

Preferred examples of $R^1$ are hydrogen or the methyl or the ethyl radical.

Examples of hydrocarbon radicals R are also valid for hydrocarbon radicals $R^2$.

The radical $R^3$ is a monovalent, optionally substituted hydrocarbon radical having at least 12 carbon atoms, preferably having at least 14 carbon atoms, and preferably at most 18 carbon atoms.

The radical $R^3$ preferably has 14 to 16 carbon atoms, and more preferably is a $C_{14}$-$C_{16}$ alkyl radical.

Examples of radicals $R^3$ are the dodecyl, tetradecyl, hexadecyl, and octadecyl radicals.

Examples of $L^2$ are divalent hydrocarbon radicals such as the methylene radical, the 1,2-ethylene radical, the 1,3-propylene radical, the 1,3-butylene radical, the 1,4-butylene radical, the 1,5-pentylene radical, and the 1,6-hexylene radical.

Particularly preferred examples are the 1,3-propylene and 1,3-butylene radicals.

Examples of $L^2$ are divalent hydrocarbon radicals such as the 1,2-ethylene radical, the 1,3-propylene radical, the 1,3-butylene radical, the 1,4-butylene radical, the 1,5-pentylene radical, and the 1,6-hexylene radical.

A particularly preferred example is the 1,2-ethylene radical.

Examples of radicals B are
—$CH_2CH_2CH_2OH$,
—$CH_2OCH_2CH_2OH$,
—$CH_2CH_2CH_2OCH_2CH_2OH$,
—$CH_2CH_2CH_2SH$,
—$CH_2CH_2CH_2NH_2$,
—$CH_2CH_2CH_2NHCH_3$,
—$CH_2CH(CH_3) NH_2$
—$CH_2CH_2CH(CH_3) NH_2$,
—$CH_2CH_2CH_2NHCH_2CH_2NH_2$, and
—$CH_2CH(CH_3) CH_2NHCH_2CH_2NH_2$.

Diketene (2) is preferably used in amounts of 0.5 to 1.5 mol, more preferably 0.7 to 1.2 mol, per mole of the sum total of $X^3$ and $X^4$ groups containing hydrogen atoms in the radical B of the formula (IV) of the organosilicon compound (1).

The diketenes (2) are compounds which are solid at room temperature, and so reaction thereof with compounds (1) preferably takes place with heating, preferably at 50 to 100° C., so that the diketenes (2) are in a molten state. An alternative possibility is to use solvents, though that procedure is not preferred.

The process for preparing the β-ketocarbonyl-functional organosilicon compounds (A) of the invention is preferably carried out under the pressure of the surrounding atmosphere, in other words at approximately 1020 hPa. The process, however, can also be carried out at higher or lower pressures.

Preferably, therefore, the aqueous dispersions comprise
(A) β-ketocarbonyl-functional organosilicon compounds of the invention which comprise at least one Si-bonded radical A of the formula (I), preferably organopolysiloxanes composed of units of the formula (II), especially organopolysiloxanes of the formula (III),
(B1) at least one nonionic emulsifier having an HLB of not more than 15,
optionally (B2) at least one further nonionic emulsifier having an HLB of more than 15,
optionally (B3) at least one anionic emulsifier,
optionally (B4) cationic emulsifiers,
(C) water
optionally (D) nonaqueous solvents or coemulsifiers, and
optionally (E) auxiliaries selected from the group of pH regulators, salts, foam inhibitors, thickeners, protective colloids, preservatives, disinfectants, wetting agents, corrosion inhibitors, dyes, fragrances, and mixtures thereof.

More preferred are aqueous dispersions comprising
(A) β-ketocarbonyl-functional organosilicon compounds of the invention which comprise at least one Si-bonded radical A of the formula (I), especially organopolysiloxanes composed of units of the formula (II), more preferably organopolysiloxanes of the formula (III), (B1) at least one nonionic emulsifier having an HLB of not more than 15, at least one further emulsifier selected from the group of
- (B2) nonionic emulsifiers having an HLB of greater than 15,
- (B3) anionic emulsifiers,
- and mixtures of (B2) and (B3), optionally (B4) cationic emulsifiers, (C) water, optionally (D) nonaqueous solvents or coemulsifiers, and optionally (E) auxiliaries selected from the group of pH regulators, salts, foam inhibitors, thickeners, protective colloids, preservatives, disinfectants, wetting agents, corrosion inhibitors, dyes, fragrances, and mixtures thereof.

The nonionic emulsifiers (B1) used in the aqueous dispersions of the invention are emulsifiers having an HLB of not more than 15, preferably not more than 14, more preferably not more than 13, and preferably not less than 6, more preferably not less than 8, most preferably not less than 9.

The HLB (HLB stands for hydrophilic-lipophilic balance) describes the hydrophilic and lipophilic fraction of primarily nonionic surfactants. The HLB for nonionic surfactants can be calculated in accordance with Hans-Dieter Dörfler, Grenzflächen- and Kolloidchemie, VCH, Weinheim, 1994, p. 198, as follows:

$$HLB = 20 \times \left(1 - \frac{M_l}{M}\right)$$

Here, $M_l$ is the molar mass of the lipophilic fraction of the surfactant molecule, and M is the molar mass of the whole molecule. The factor 20 is a freely selected scaling factor.

(Nonlimiting) examples of nonionic emulsifiers (B1) used in the aqueous dispersions of the invention and having an HLB of not more than 15 are:
1. Alkyl polyglycol ethers, preferably those having 3 to 20 EO units and alkyl radicals of 8 to 18 carbon atoms.
2. Carboxylic acid polyglycol esters, especially fatty acid polyglycol esters, preferably those having 3 to 20 EO units and carboxylic acid radicals of 8 to 18 carbon atoms.
3. Ethoxylated or nonethoxylated sorbitan fatty acid esters.
4. Ethoxylated castor oil or hydrogenated variants.
5. Polyglycerol carboxylic esters.
6. Alkyl polyglycosides of the general formula R*—O—ZO, in which R* is a linear or branched, saturated or unsaturated alkyl radical having on average 8-24 carbon atoms and ZO is an oligoglycoside radical with on average o=1-10 hexose or pentose units or mixtures thereof.
7. Alkylaryl polyglycol ethers, preferably those having 5 to 20 EO units and 8 to 18 carbon atoms in the alkyl and aryl radicals.
8. Ethylene oxide/propylene oxide (EO/PO) block copolymers, having an HLB of less than 15, such as those known as poloxamers (block copolymers of ethylene oxide and propylene oxide units,
9. Polyvinyl alcohol still containing 5 to 50%, preferably 8 to 20%, vinyl acetate units, having a degree of polymerization of 500 to 3000.
10. Adducts of alkylamines having alkyl radicals of 8 to 22 carbon atoms with ethylene oxide or propylene oxide.
11. Natural substances and derivatives thereof, preferably selected from the group of lecithin, lanolin, saponins, cellulose; cellulose alkyl ethers and carboxyalkylcelluloses, the alkyl groups of which in each case possess up to 4 carbon atoms.
12. Linear organo(poly)siloxanes comprising polar groups, especially the elements O, N, C, S, P, Si, more particularly those organo(poly)siloxanes having alkoxy groups with up to 24 carbon atoms and/or up to 40 EO and/or PO groups.

Preferred examples of nonionic emulsifiers (B1) are
1. Alkyl polyglycol ethers, examples being Oleth-10, Laureth-3, Laureth-4, Trideceth-5, Trideceth-6, Trideceth-8, Trideceth-10 or Trideceth-12 (according to INCI nomenclature).
2. Carboxylic acid polyglycol esters, examples being PEG-7 Olivate, PEG-8 Oleate or PEG-8 Laurate (according to INCI nomenclature).
3. Ethoxylated or nonethoxylated sorbitan fatty acid esters, examples being Sorbitan Laurate, Sorbitan Stearate, Sorbitan Distearate or Polysorbate 85 (according to INCI nomenclature).
4. Ethoxylated castor oil or hydrogenated variants, as for example (INCI nomenclature) PEG-25 Hydrogenated Castor Oil.
5. Polyglycerol carboxylic esters, examples being polyglycerol-2 oleate, polyglycerol-10 distearate or polyglycerol-2-stearate.
6. Alkylpolyglycosides, examples being Glucopon 225, Glucopon 600 (according to tradename),
7. Polyalkylene block polymers, examples being PEG-PPG-PEG block polymer Pluronic® L-31, PEG-PPG-PEG block polymer Pluronic® L-61, PPG-PEG-PPG block polymer Pluronic® 17R4, PPG-PEG-PPG Pluronic® block polymer 31R1 (HLB in each case<7) (available from Sigma-Aldrich).

(Nonlimiting) examples of nonionic emulsifiers (B2) used optionally in the aqueous dispersions of the invention and having an HLB of greater than 15 are:
1. Alkyl polyglycol ethers, preferably those having 15 to 200 EO units and alkyl radicals of 8 to 18 carbon atoms.
2. Carboxylic acid polyglycol esters, especially fatty acid polyglycol esters, preferably those having 15 to 200 EO units and carboxylic acid radicals of 8 to 18 carbon atoms.
3. Ethoxylated sorbitan fatty acid esters, preferably monoesters.
4. Ethoxylated castor oil or hydrogenated variants, preferably those 40 to 250 EO units.
5. Polyglycerol carboxylic esters, preferably monoesters and those having more than 5 glyceryl units.
6. Alkyl polyglycosides of the general formula R*—O—ZO, in which R* is a linear or branched, saturated or unsaturated alkyl radical having preferably not more than 10 carbon atoms and ZO is an oligoglyoside radical with on average o=1-10 hexose or pentose units or mixtures thereof.
7. Alkylaryl polyglycol ethers, preferably those having 15 to 200 EO units and alkyl radicals of 8 to 18 carbon atoms in the alkyl and aryl radicals.
8. Ethylene oxide/propylene oxide (EO/PO) block copolymers, having an HLB of greater than 15, such as those known as poloxamers (block copolymers of ethylene oxide and propylene oxide units.

Preferred examples of nonionic emulsifiers (B2) having an HLB of greater than 15 are
1. Alkyl polyglycol ethers, examples being Ceteareth-20, Oleth-20, Laureth-20, Laureth-23, Trideceth-16, Trideceth-20, Steareth-20 or Steareth-21 (according to INCI nomenclature).

2. Carboxylic acid polyglycol esters, especially fatty acid polyglycol esters, examples being PEG-20 Stearate, PEG-20 Laurate or PEG-100 Stearate (according to INCI nomenclature).
3. Ethoxylated sorbitan fatty acid esters, examples being Polysorbate 20, Polysorbate 60 or Polysorbate 80 (according to INCI nomenclature).
4. Ethoxylated castor oil or hydrogenated variants, as for example (INCI nomenclature) PEG 200 Castor Oil or PEG-60 Hydrogenated Castor Oil.
5. Polyglycerol carboxylic esters, examples being polyglycerol-10 oleate, polyglycerol-10 laurate or polyglycerol-10-stearate.
7. Polyalkylene block polymers, as for example PEG-PPG-PEG block polymer Pluronic® F-108 (HLB>24; Mn≈14600) (available from Sigma-Aldrich).

(Nonlimiting) examples of anionic emulsifiers (B3) used optionally in the aqueous dispersions of the invention are:
1. Alkyl sulfates, particularly those having a chain length of 8 to 18 carbon atoms, alkyl and alkaryl ether sulfates having 8 to 18 carbon atoms in the hydrophobic radical and 1 to 30 ethylene oxide (EO) and/or propylene oxide (PO) units.
2. Sulfonates, particularly alkyl sulfonates having 8 to 18 carbon atoms, alkylaryl sulfonates having 8 to 18 carbon atoms.
3. Alkali metal salts and ammonium salts of carboxylic acids having 8 to 20 carbon atoms in the alkyl, aryl, alkaryl or aralkyl radical, especially alkali metal salts and ammonium salts of fatty acids, preferably those with carboxylic acid radicals of 8 to 20 carbon atoms.

The anionic emulsifier (B3) present optionally is preferably selected from the group of the carboxylates, the sulfates, and the sulfonates.

Preferred examples of anionic emulsifiers (B3) are alkali metal salts and ammonium salts of carboxylic acids having 8 to 20 carbon atoms in the alkyl, aryl, alkaryl or aralkyl radical. Particularly preferred anionic emulsifiers (B3) are alkali metal salts and ammonium salts of fatty acids, preferably those having carboxylic acid radicals of 8 to 20 carbon atoms, such as, for example, sodium salts, potassium salts, triethanol ammonium salts of lauric acid, myristic acid, palmitic acid, stearic acid or else oleic acid.

Anionic emulsifiers which contain carboxylic ester groups, especially the sulfosuccinates; anionic emulsifiers which contain amide groups, especially the sarcosides or taurides; or anionic emulsifiers which contain phosphoric ester groups are preferably excluded.

With particular preference the following anionic emulsifiers are excluded:
Sulfosuccinates of the formula

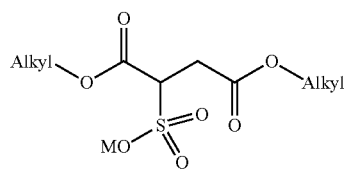

Sarcosides of the formula

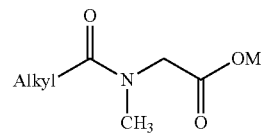

and
ethoxylated phosphoric esters of the formula

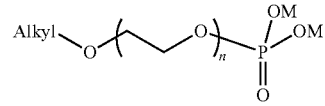

where Alkyl is an alkyl radical having 6 to 20 carbon atoms, such as a 2-ethylhexyl radical, n-decyl radical, n-dodecyl radical, n-pentadecyl radical, n-hexadecyl radical, n-heptadecyl radical or n-octadecyl radical, and M is a metal ion, especially an alkali metal ion, such as a sodium ion.

(Nonlimiting) examples of cationic emulsifiers (B4) used optionally in the aqueous dispersions of the invention are:
1. Salts of primary, secondary, and tertiary fatty amines having 8 to 24 carbon atoms with acetic acid, sulfuric acid, hydrochloric acid, and phosphoric acids.
2. Alkylpyridinium, alkylimidazolinium, and alkyloxazolinium salts, particularly those with an alkyl chain possessing up to 18 carbon atoms, especially the halides, sulfates, phosphates, and acetates.
3. Quaternary alkylammonium and alkylbenzeneammonium salts, particularly those with alkyl groups possessing 6 to 24 carbon atoms, especially the halides, sulfates, phosphates, and acetates.

The nonionic emulsifiers (B2) or anionic emulsifiers (B3) or cationic emulsifiers (B4) used optionally in the aqueous dispersions of the invention may consist of one of the aforesaid emulsifiers or of a mixture of two or more of aforesaid emulsifiers.

The nonionic emulsifiers (B1) used, and/or nonionic emulsifiers (B2), anionic emulsifiers (B3) or cationic emulsifiers (B4) optionally used, in the aqueous dispersions of the invention may be used in pure form or as solutions of one or more emulsifiers in water or organic solvents.

Further ingredients used in the aqueous dispersions of the invention may be
(D) nonaqueous solvents or coemulsifiers.

The aqueous dispersions of the invention optionally comprise (D) nonaqueous solvents or coemulsifiers, preferably in an amount of at least 0.1 wt %, more preferably at least 0.4 wt %, most preferably at least 0.8 wt %, and preferably at most 20 wt %, more preferably at most 15 wt %, and most preferably at most 10 wt %.

The nonaqueous solvents (D) which may be used in the aqueous dispersions of the invention come, for example, from the group of the mono- or polyhydric alcohols, alkanolamines or glycol ethers.

Examples of solvents are ethanol, n- or isopropanol, butanols such as 1-butanol, 2-butanol or 2-methyl-2-propanol, pentanols such as 1-pentanol, 2-pentanol or 3-pentanol, hexanols such as 1-hexanol, 2-hexanol or 3-hexanol, heptanols such as 1-heptanol, 2-heptanol, 3-heptanol or 4-heptanol, octanols such as 1-octanol, 2-octanol, 3-octanol or 4-octanol, glycol, propanediol, butanediols such as 1,2-butanediol or 1,3-butanediol, hexanediols such as 1,2-hexanediol or 2-methylpentane-2,4-diol, octanediols such as 2-ethylhexane-1,3-diol or 1,2-octanediol, glycerol, diglycol, propyl- or butyl diglycol, ethylene glycol methyl ether, ethylene glycol ethyl ether, ethylene glycol propyl ether, ethylene glycol mono-n-butyl ether, diethylene glycol methyl ether, diethylene glycol ethyl ether, diethylene glycol mono-n-butyl ether, propylene glycol methyl ether, propylene glycol ethyl ether, propylene glycol propyl ether, propylene glycol b-butylether, propylene glycol tert-butyl ether, methoxytriglycol, ethoxytriglycol, butoxytriglycol, dipropylene glycol monomethyl ether, dipropylene glycol monoethyl ether, 1-butoxyethoxy-2-propanol or 3-methyl-3-methoxybutanol, 1-aminobutane, 2-aminobutane, 2-amino-2-methylpropane, 1-aminopentane, 2-aminopentane, 1-aminohexane, 1-aminoheptane, and 1-aminooctane; ethyl, propyl, isopropyl, butyl, isobutyl, pentyl, isopentyl, and hexyl acetate; methyl, ethyl, and tert-butyl propionate; methyl, ethyl, propyl, and butyl butyrate; 2-butanone, 2-pentanone, 3-pentanone, 4-methyl-2-pentanone, 2-hexanone, 3-hexanone, 2-heptanone, 3-heptanone, 4-heptanone, 5-methyl-3-heptanone, 2-octanone, and 3-octanone, and also mixtures of these cosurfactants.

Examples of preferred nonaqueous solvents or coemulsifiers (D) are 1-alkanols of the above-recited examples with C5 to C8 chains, alkanediols of the above-recited examples with a C4 to C8 chain, glycerol, propyl, butyl, and pentyl acetates, 2-pentanone, and also the above-recited ethylene, propylene, dipropylene or diethylene glycol monoalkyl ethers. Particularly preferred as nonaqueous solvents or coemulsifiers (D) are 1-pentanol, 1-hexanol, 1-octanol, propanediol, 1,3-butanediol, 1,2-hexanediol, 2-ethylhexane-1, 3-diol, 1,2-octanediol, glycerol, diethylene glycol methyl ether, diethylene glycol ethyl ether, diethylene glycol mono-n-butyl ether, and/or propylene glycol methyl ether.

It is further possible for polyalkylene glycols, such as polyethylene glycols (e.g., PEG600, PEG1000 or PEG6000) or polypropylene glycols (e.g., PPG2000) or else poloxamines (copolymers of ethylene oxide and propylene oxide units which are bridged via an ethylenediamine core), such as Tetronic 701 or Tetronic 90R4 (available from Sigma-Aldrich), to be used as coemulsifiers.

Further ingredients that can be used in the aqueous dispersions of the invention are
(E) auxiliaries selected from the group of pH regulators, salts, foam inhibitors, thickeners and/or protective colloids, preservatives, disinfectants, wetting agents, corrosion inhibitors, dyes, fragrances, and mixtures thereof.

pH regulators which can be used here are all known acids and alkalis, provided the use thereof is not prohibited on technical or environmental grounds and/or on grounds of consumer protection.

Examples of mineral acids are hydrochloric, perchloric, sulfuric, sulfurous, nitric, nitrous, hydrofluoric, phosphoric, diphosphoric, and polyphosphoric acids. Examples of suitable carboxylic acids are formic, acetic and propionic, butanoic acids, citric acid, trichloro-, dichloro-, and chloroacetic acids, trifluoroacetic acid, cyanoacetic acid, phenylacetic acid, benzoic acid, m- and p-nitrobenzoic acid, oxalic acid, malonic acid, and lactic acid.

Particularly preferred are acetic acid and formic acid.

Examples of alkalis are salt, such as alkali(ne earth) metal hydroxides, e.g., sodium hydroxide, potassium hydroxide, lithium hydroxide; alkali(ne earth) metal carbonates, e.g., potassium carbonate, sodium carbonate, lithium carbonate; or ammonium salts, e.g., ammonium hydroxide, or aqueous solutions thereof; and organic amines, e.g., triethanolamine (TEA), triethylamine, isopropylamine, or aqueous solutions thereof.

Particularly preferred are sodium hydroxide, potassium hydroxide or triethanolamine.

In the context of the present invention, the pH is measured with an electrode in accordance with US Pharmacopeia USP 33 at 20° C.

The pH of the dispersion of the invention is preferably 3 to 11, more preferably 5 to 9.

Examples of salts (electrolytes) are, in particular, those from the group of the inorganic salts, where a broad number of a wide variety of different salts can be used. Preferred cations are the alkali metals and alkaline earth metals; preferred anions are the halides and sulfates. From a production standpoint, the use of sodium acetate or sodium chloride in the aqueous dispersions of the invention is preferred.

Examples of foam inhibitors are soaps, paraffins or silicone oils.

Examples of preservatives are methylisothiozolinon, chloromethylisothiazolinone, benzylisothiazolinone, phenoxyethanol, methylparaben, ethylparaben, propylparaben, butylparaben, isobutylparaben, alkali metal benzoates, alkali metal sorbates, iodopropynyl butyl carbamate, benzyl alcohol, and 2-bromo-2-nitropropane-1,3-diol.

In the aqueous dispersions of the invention, the auxiliaries (E), used optionally, are preferably used in an amount of at least 0.01 part by weight, more preferably at least 0.04 part by weight, and preferably at most 20 parts by weight, most preferably at most 15 parts by weight, more particularly at most 10 parts by weight, based in each case on 100 parts by weight of the aqueous dispersions of the invention.

A further subject of the invention is a method for producing the aqueous dispersions of the invention, by mixing the
(A) β-ketocarbonyl-functional organosilicon compounds of the invention with
(B1) at least one nonionic emulsifier having an HLB of not more than 15,
optionally (B2) at least one further nonionic emulsifier having an HLB of greater than 15,
optionally (B3) at least one anionic emulsifier,
optionally (B4) cationic emulsifiers,
optionally (D) nonaqueous solvents or coemulsifiers,
optionally (E) auxiliaries, and
(C) water with one another.

Stable dispersions are formed. As a result, the β-ketocarbonyl-functional organosilicon compounds (A) are in finely distributed form.

The nature of the mixing of the components which are used for producing the dispersions of the invention is not very critical and can be performed in various orders.

However, depending on the components (A), (B1), (C), optionally (B2), optionally (B3), optionally (B4), optionally (D), and optionally (E), preferred procedures may come about, which should be tested in each individual case.

One favored method is the production of the aqueous polysiloxane dispersions via a preliminary dispersion comprising β-ketocarbonyl-functional organosilicon compounds (A), the nonionic emulsifiers (B1), optionally nonionic emulsifiers (B2), optionally anionic emulsifiers (B3), optionally cationic emulsifiers (B4), optionally the nonaqueous solvent or coemulsifier (D), and water (C), where less than 10 wt % of water, preferably less than 7.5 wt % of water, (C), is used, based in each case on the sum total of β-ketocarbonyl-functional organosilicon compounds (A) and the emulsifiers (B1) and optionally (B2), (B3), and (B4).

The preliminary dispersion is generated by incorporating the β-ketocarbonyl-functional organosilicon compounds (A)

in two or more portions, preferably more than two portions, into a mixture composed of the nonionic emulsifiers (B1), optionally nonionic emulsifiers (B2), optionally anionic emulsifiers (B3), optionally cationic emulsifiers (B4), optionally nonaqueous solvent or coemulsifier (D), and the above-indicated portion of water (C).

The aqueous dispersions of the invention are obtained, finally, by adding the remaining amount of water (C) and also any auxiliaries (E) to the preliminary dispersion produced.

Where the β-ketocarbonyl-functional organosilicon compounds (A) and/or the nonionic emulsifiers (B1) and/or optionally nonionic emulsifiers (B2) and/or optionally anionic emulsifiers (B3) and/or optionally cationic emulsifiers (B4) are substances which at 20° C. are waxlike or solid, the preliminary dispersion is produced preferably at relatively high temperatures. The emulsifying operation for producing the preliminary dispersion is carried out, accordingly, preferably at temperatures of at least 20° C., more preferably at least 30° C., most preferably at least 40° C., and preferably at most 90° C., more preferably at most 80° C., most preferably at most 70° C.

In this case, furthermore, it is necessary for the β-ketocarbonyl-functional organosilicon compounds (A) and/or the nonionic emulsifiers (B1) and/or optionally nonionic emulsifiers (B2) and/or optionally anionic emulsifiers (B3) and/or optionally cationic emulsifiers (B4) to be heated to the corresponding temperature above the melting temperature before being incorporated, so as to enable metering.

The β-ketocarbonyl-functional organosilicon compounds (A) are preferably incorporated into the emulsifier-water mixture with accompanying exposure to high shearing forces. High shearing forces may be achieved, for example, by rotor-stator stirring devices or by dissolver disks. These are technologies which are known in the production of dispersions or emulsions of organopolysiloxanes. Homogenizing equipment and techniques of these kinds are described for example in Ullmann's Encyclopedia of Industrial Chemistry, CD-ROM edition 2003, Wiley-VCH Verlag, under the entry heading "Emulsions".

Rotor-stator stirring devices consist of a rotor within a fixed stator. Through the slots between the rotor teeth, the product to be emulsified enters the shearing zone, which it leaves again via the stator slots. The narrow radial gap between rotor and stator, and the high peripheral speed of the rotating rotor, generate very large shear gradients (see, e.g. IKA Dispersers Brochure, 2013-05).

In dissolver disk stirrers, a toothed stirring disk is mounted on a vertical stirring shaft, and this disk is immersed into the product to be dispersed. Rotational movement of the disk produces shearing forces, which are likewise dependent on the peripheral speed (see, e.g., Rompp Chemie Lexikon online, 2014, Dissolvers Section).

As mixing and homogenizing tools, furthermore, it is possible to use all other dispersing devices known to the skilled person, such as, for example, stirrers, compounders, ultrasound homogenizers or high-pressure homogenizers of any of a wide variety of constructions.

Furthermore, the method of the invention is preferably carried out under the pressure of the surrounding atmosphere, but may also be carried out at higher or lower pressures.

The dispersions of the invention comprising β-ketocarbonyl-functional organosilicon compounds (A) may be produced batchwise, semibatchwise, or continuously.

One advantage of the aqueous dispersions of the invention over the prior art is their high storage stability. Storage-stable dispersions are those dispersions in which after 30 days of storage at 50° C., preferably in a drying cabinet, there is no visible separation into two phases.

A further subject of the invention is a method for finishing fibrous substrates, preferably textiles, more particularly a method for impregnating and/or hydrophobizing fibrous substrates, preferably textiles, with compositions comprising the aqueous dispersions of the invention.

Carried out with preference is a method for finishing fibrous substrates, preferably textiles, more particularly a method for impregnating and/or hydrophobizing fibrous substrates, preferably textiles, with compositions comprising aqueous dispersions comprising (A) β-ketocarbonyl-functional organosilicon compounds of the invention which comprise at least one Si-bonded radical A of the formula (I), especially organopolysiloxanes composed of units of the formula (II), preferably organopolysiloxanes of the formula (III), (B1) at least one nonionic emulsifier having an HLB of not more than 15, (C) water, optionally (B2) at least one further nonionic emulsifier having an HLB of greater than 15, optionally (B3) at least one anionic emulsifier, optionally (B4) cationic emulsifiers, optionally (D) nonaqueous solvents or coemulsifiers, and optionally (E) auxiliaries selected from the group of pH regulators, salts, foam inhibitors, thickeners, protective colloids, preservatives, disinfectants, wetting agents, corrosion inhibitors, dyes, fragrances, and mixtures thereof.

Carried out more preferably is a method for finishing fibrous substrates, preferably textiles, more particularly a method for hydrophobizing fibrous substrates, preferably textiles, with compositions comprising aqueous dispersions comprisings (A) β-ketocarbonyl-functional organosilicon compounds of the invention which comprise at least one Si-bonded radical A of the formula (I), especially organopolysiloxanes composed of units of the formula (II), more preferably organopolysiloxanes of the formula (III), (B1) at least one nonionic emulsifier having an HLB of not more than 15, at least one further emulsifier selected from the group of (B2) nonionic emulsifiers having an HLB of greater than 15, (B3) anionic emulsifiers, and mixtures of (B2) and (B3), optionally (B4) cationic emulsifiers, (C) water, optionally (D) nonaqueous solvents or coemulsifiers, and optionally (E) auxiliaries selected from the group of pH regulators, salts, foam inhibitors, thickeners, protective colloids, preservatives, disinfectants, wetting agents, corrosion inhibitors, dyes, fragrances, and mixtures thereof.

The aqueous dispersions of the invention have the advantage that they are products which are safe to handle and are capable of providing fibers with washfast water repellency and a soft finish.

The aqueous dispersions of the invention have the advantage that they permit very effective water repellency finishing of various textiles, that they are simple and safe to process, that they can be produced without substances that are long-term environmental pollutants, and that the water-repellent finish withstands washing very effectively.

A further advantage of the aqueous dispersions of the invention is that they can be mixed with amino-functional organosilicon compounds (F') or aqueous dispersions (F')
thereof, without the resultant mixtures exhibiting any instability.

The aqueous dispersions (F') are preferably aqueous emulsions.

Additionally, the aqueous dispersions of the invention can be used in combination with amino-functional organosilicon compounds (F) or aqueous dispersions (F') thereof for finishing fibrous substrates, especially textiles, preferably in order to endow them with washfast water repellency and a soft finish.

Amino-functional organosilicon compounds (F) are preferably organosilicon compounds having at least one radical Q of the general formula

where
$X^5$ is a radical of the formula —NH— or —NR$^2$—, preferably —NH—,
$X^6$ is a radical of the formula —NH$_2$ or —NR$^2$H, preferably —NH$_2$,
z is 0, 1, 2 or 3, preferably 0 or 1, more preferably 1, and
$R^2$, $L^1$, $L^2$, and (Si) have the definition stated for them above.

It is possible to use one kind of amino-functional organosilicon compound (F) or two or more kinds of amino-functional organosilicon compounds (F).

Preferred for use as amino-functional organosilicon compounds (F) are organopolysiloxanes consisting of units of the general formula

where
Q is a radical of the formula (VIII),
R and $R^4$ have the definition stated for them above,
p is 0 or 1,
q is 0, 1, 2 or 3, and
is 0 or 1,
with the proviso that the sum p+q+r is not more than 3 and there is on average at least one radical Q per molecule.

More preferred for use as amino-functional organosilicon compounds (F) are organopolysiloxanes of the general formula

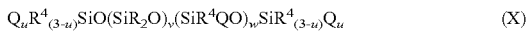

where
Q is a radical of the formula (VIII),
R and $R^4$ have the definition stated for them above,
u is 0 or 1,
is 0 or an integer from 1 to 2000, and
w is 0 an integer from 1 to 20,
z is 0, 1, 2 or 3, preferably 0 or 1, more preferably 1,
with the proviso that there is on average at least one radical Q per molecule, meaning that, respectively,
if u is 0, w is not 0, and
if w is 0, u is 1.

Amino-functional organosilicon compounds (F) are prepared preferably by the processes described in US 2005/0215806 A1, US 2002/0049296 A1 or US 2015/0112092 A1.

Examples of radicals Q are
—CH$_2$CH$_2$CH$_2$NH$_2$,
—CH$_2$CH$_2$CH$_2$NHCH$_3$,
—CH$_2$CH(CH$_3$) NH$_2$
—CH$_2$CH$_2$CH(CH$_3$) NH$_2$,
—CH$_2$CH$_2$CH$_2$NHCH$_2$CH$_2$NH$_2$, and
—CH$_2$CH(CH$_3$) CH$_2$NHCH$_2$CH$_2$NH$_2$.

The amino-functional organosilicon compounds (F) used may be waxlike solids or liquids. In the latter case, they preferably have a viscosity of 1 to 1,000,000 mPa·s at 25° C., more preferably 100 to 50,000 mPa·s at 25° C.

The amino-functional organosilicon compounds (F) used may further be combined in the form of aqueous dispersions (F') with the aqueous dispersions of the invention comprising β-ketocarbonyl-functional organosilicon compounds (A) of the invention.

The aqueous dispersions (F') comprise the amino-functional organosilicon compounds (F), additionally one or more emulsifiers (B'), water (C'), and also, optionally, nonaqueous solvents or coemulsifiers (D'), and also, optionally, adjuvants (E').

In the aqueous dispersion (F'), emulsifiers (B') are preferably used in amounts of 1 to 60 parts by weight, more preferably 2 to 30 parts by weight, based in each case on 100 parts by weight of the aqueous dispersions (F').

Emulsifiers (B') which can be used are the aforementioned nonionic emulsifiers (B1) and/or (B2), anionic emulsifiers (B3), cationic emulsifiers (B4), and also, additionally, protective colloids or particles.

In the aqueous dispersions (F'), any nonionic solvents or coemulsifiers (D') are preferably used in an amount of at least 0.1 part by weight, most preferably at least 0.4 part by weight, more particularly at least 0.8 part by weight, and preferably at most 20 parts by weight, most preferably at most 15 parts by weight, more particularly at most 10 parts by weight, based in each case on 100 parts by weight of the aqueous dispersions (F').

As nonaqueous solvents or coemulsifiers (D'), used optionally, it is possible to use the aforementioned nonaqueous solvents or coemulsifiers (D).

In the aqueous dispersions (F'), any auxiliaries (E') are preferably used in an amount of at least 0.01 part by weight, more preferably at least 0.04 part by weight, and preferably at most 20 parts by weight, more preferably at most 15 parts by weight, more particularly at most 10 parts by weight, based in each case on 100 parts by weight of the aqueous dispersions (F').

As auxiliaries (E'), used optionally, it is possible to use the aforementioned auxiliaries (E).

The aqueous dispersions (F') may be produced using mixing and homogenizing tools as described above for the dispersions of the invention comprising the β-ketocarbonyl-functional organosilicon compounds (A) of the invention.

The β-ketocarbonyl-functional organosilicon compounds (A) and the amino-functionalized organosilicon compounds (F) may be used in weight ratios of 1:99 to 99:1, preferably in weight ratios of 20:80 to 80:20, more preferably in weight ratios of 40:60 to 70:30.

Furthermore, the aqueous dispersions of the invention can be used in combination with amino-functional organosilicon compounds (F) or aqueous dispersions (F') thereof and in combination with organometallic compounds (G) for treating fibers, especially textiles, preferably in order to endow them with washfast water repellency and a soft finish.

Organometallic compounds (G) used may be amines, alkoxides, carboxylic acid salts, phosphoric acid salts or chelates of metals selected from the group of Pb, Zn, Zr, Sb, Fe, Cd, Sn, Ti, Ba, Ca, Mn, V, Al, and Co.

Preference is given to using organometallic compounds of Zn, Zr, Ti, and of Al. Particularly preferred are organometallic compounds of Zr and Ti.

Examples of carboxylic acid salts are naphthenates, octoates, hexoates, laurates, acetates, formates, citrates, and lactates.

Examples of organometallic compounds (G) are zinc, tin, and zirconium octoates; aluminum alkoxides, such as Al tri-sec-butoxide, Al di-sec-butoxide monoacetylacetonate, Al mono-sec-butoxide diacetylacetonate, A di-sec-butoxide monoethyl acetate, Al mono-sec-butoxide diethyl acetate, Al di-sec-butoxide monoacetate, and Al mono-sec-butoxide diacetate; alkyl titanates; alkyl zirconates; zinc, tin, zirconium ferri-, and cobalt naphthenate; zinc and zirconium formates; tin, zinc, and zirconium acetates; dibutyltin dicaprylate, dilaurate, diacetate, and maleate; dioctyltin diformate, dibenzoate, and dicrotonate; alkanolamine titanates and zirconates; titanium phosphates; titanium acetylacetonates; ethyl citrate zirconate; and trialkoxyvanadates, such as trimethoxyvanadate, tri-n-butoxyvanadate, and tri-heptoxyvanadate. Preference is given to using alkoxides and carboxylic acid salts of titanium and zirconium.

Particularly preferred are butyl titanate, zirconium octoate, and zirconium acetate.

It is possible to use one kind of organometallic compound (G) or two or more kinds of organometallic compounds (G).

Where organometallic compounds (G) are also used, they can be employed in amounts of 0.1 to 15 parts by weight, preferably 0.5 to 8 parts by weight, based on the metal content of the organometallic compounds (G) and based on 100 parts by weight of β-ketocarbonyl-functional organosilicon compounds (A) and amino-functionalized organosilicon compounds (F).

The dispersions of the invention comprising the β-ketocarbonyl-functional organosilicon compounds (A) of the invention may be mixed with the amino-functional organosilicon compound (F) or aqueous dispersions (F') thereof and also with the organometallic compounds (G), especially using any of a wide variety of different mixing and homogenizing tools, as have been described above.

A subject of the invention is therefore compositions comprising aqueous dispersions of the invention comprising β-ketocarbonyl-functional organosilicon compounds (A) of the invention,
(F) amino-functional organosilicon compounds or aqueous dispersions thereof, especially organopolysiloxanes of the formula (X) or aqueous dispersions thereof,
and optionally
(G) organometallic compounds.

A subject of the invention is therefore a method for finishing fibrous substrates, preferably textiles, with the compositions of the invention.

The compositions of the invention are preferably applied to the fibrous substrates, especially textiles, and allowed to dry.

In a preferred method for impregnating and/or hydrophobizing fibrous substrates, preferably textiles, with the compositions of the invention, the compositions of the invention are applied to the fibrous substrates, preferably textiles, and the treated fibrous substrates, preferably the treated textiles, are then allowed to dry.

Examples of fibrous substrates are natural or synthetically produced fibers, yarns, skeins, cables, sheetlike textile structures such as nonwovens, mats, woven, knotted or knitted textiles, and also leather and leatherette. Preferred fibrous substrates are textiles.

For the application of the composition of the invention, the textiles may be present in the form of individual fibers, fiber bundles, fiberfill fibers, yarns, carpets, fabric webs or garments or parts of garments.

The textiles may consist of cotton, wool, copolymers of vinyl acetate, rayon, hemp, natural silk, polypropylene, polyethylene, polyester, polyurethane, polyamide, aramid, polyimide, polyacrylate, polyacrylonitrile, polylactide, polyvinyl chloride, glass fibers, ceramic fibers, cellulose or mixtures thereof.

Application to the fibrous substrates, more particularly textiles, to be treated may take place in any desired manner which is suitable and widely known for the treatment of fibrous substrates, more particularly textiles; for example, by dipping, spreading, casting, spraying, rolling, padding, printing or foam application.

In the application, the composition of the invention may be combined with commonplace textile auxiliaries, such as, for example, binders comprising melamine resins or methylol resins, polyurethanes, polyacrylates, polyvinyl alcohols, polyvinyl acetates, optical brighteners, wetting assistants, defoamers, or further hydrophobizing and oleophobizing assistants such as perfluorinated hydrocarbons.

The treated fibrous substrates, especially textiles, are allowed to dry preferably at temperatures of 10° C. to 250° C., more preferably 25 to 200° C., most preferably 80° C. to 180° C.

In the course of drying, the composition of the invention is crosslinked and the treated fibrous substrates, especially textiles, undergo impregnation and/or hydrophobization, and are made water-repellent.

In the examples below, all data for parts and percentages, unless otherwise indicated, are given by weight.

Unless otherwise indicated, the following examples are carried out under a pressure of the surrounding atmosphere, in other words at approximately 1000 hPa, and at room temperature, in other words approximately 20° C., or at a temperature which comes about when the reactants are brought together at room temperature without additional heating or cooling.

With regard to the HLB data, the HLB values used are those reported by the respective manufacturers. Because emulsifiers, like the polyethers, for example, are usually oligomers/polymers with a distribution of molecular weights, this distribution may vary from one producer to another. Accordingly, from producer to producer, there may also be different figures for the corresponding HLB, which may also differ from the HLB determined theoretically for the particular chemical name specified.

Dynamic viscosities were measured on an Anton Paar MCR 302 rheometer according to DIN EN ISO 3219: 1994 and DIN 53019, using a cone/plate system (CP50-2 cone) with an opening angle of 2°. The instrument was calibrated using standard oil 10 000 from the Physikalisch-Technische Bundesanstalt. The measurement temperature is 25.00° C.+/−0.05° C., the measuring time 3 minutes. The viscosity figure (reported in mPas) represents the arithmetic mean of three individual measurements carried out independently. The uncertainty of the dynamic viscosity measurement is 1.5%. The shear rate gradient was selected as a function of the viscosity, and is identified separately for each viscosity figure.

Kinematic viscosities are determined by means of a ViscoSystem® AVS 350 viscosity measurement system from Schott, using Ubbelohde viscosimeter tubes with a constant (e.g., from Windaus or from VWR) in accordance with DIN 51562 Part 1 or ISO/DIS 3105 (including calibration thereof). The measurements take place at a temperature of 25.0° C. (+−0.1° C.). The viscosity figure (reported in mm$^2$/s) represents the arithmetic mean of three individual measurements carried out independently: the uncertainty of the kinematic viscosity measurement is 1.05%. Depending on the measuring range, different viscometer tubes with corresponding directional constants are used:

| Measuring range | Capillary No. | Directional constant |
|---|---|---|
| 0.5-3 mm$^2$/s | 0c | 0.003K |
| 0.8-5 mm$^2$/s | 0a | 0.005K |
| 1.2-10 mm$^2$/s | I | 0.01K |
| 3-30 mm$^2$/s | Ic | 0.03K |
| 10-100 mm$^2$/s | II | 0.10K |
| 30-300 mm$^2$/s | IIc | 0.30K |
| 100-1000 mm$^2$/s | III | 1K |
| 300-3000 mm$^2$/s | IIIc | 3K |
| 1000-10000 mm$^2$/s | IV | 10K |

The measuring range, the corresponding capillary No., and the constant are stated in accordance with VWR laboratory catalog, 2011-2013, page 645.8.

The amine number reports the number of mmol of KOH that are equivalent to one gram of the substance under determination. The amine number is determined according to DIN 16945, version 1989-03.

$^1$H NMR spectra are recorded as a solution in CDCl3 on a Bruker Avance 500 NMR spectrometer (5 mm selective $^1$H NMR sample head) with a 500.13 MHz measuring frequency.

Evaluation takes place in a manner known to those skilled in the art and described in the following literature: "Über die $^1$H-, $^{13}$C- und $^{29}$Si-NMR chemischen Verschiebungen einiger linearer, verzweigter und cyclischer Methyl-Siloxan-Verbindungen", G. Engelhardt, H. Jancke; J. Organometal. Chem. 28 (1971), 293-300; "Chapter 8—NMR spectroscopy of organosilicon compounds", Elizabeth A. Williams, The Chemistry of Organic Silicon Compounds, 1989 John Wiley and Sons Ltd, 511-533.

The particle sizes are determined on a Zetasizer Nano-S particle size measuring instrument from Malvern, Software Version 6.01, by dynamic light scattering (Mie measurement method). For this purpose, the dispersions are diluted to 0.5 wt % with filtered and degassed water. The values reported always refer to the D(50) value. D(50) should be understood as the volume-average particle diameter, at which 50% of all the particles measured have a volume-average diameter smaller than the D(50) figure identified. The measurements take place at 25° C. with the following specified settings: refractive index of water (dispersant RI) at 1.330; viscosity (cP) at 0.8872; refractive index of the disperse phase (material RI) at 1.39; material absorption at 0.010; measuring time (duration used) at 50 s; measurement position at 0.65 mm. The photon count rates reported in the dispersion examples come from the particular degree of dilution of the samples, and therefore differ. All that is important here is that the measurement program releases the results with the comment 'Result Quality: Good'.

The hydrophobicity of the treated textiles is tested via spray testing in accordance with AATCC Test Method No. 22-2005. In this test, the textiles are spotted with deionized water. The outcome, from comparing the spotted textile surface with the rating pictures in the description of the method, provides an approximate indication of the percent of the area that has remained unwetted. A spray value of 100 denotes a completely unwetted textile.

Example 1: β-Ketocarbonyl-Functional Organosilicon Compound A1

50.7 g of technical alkylketene dimer (available from TRIGON Chemie GmbH), prepared from a mixture of palmitic/stearic acid (about 30/70), resulting in a C14/C16 alkyl radical R$^3$, are melted at 50° C. 500.0 g of a polysiloxane consisting of (3-aminopropyl)dimethylsiloxy units and dimethylsiloxy units, with a kinematic viscosity of 508 mm$^2$/s (25.0° C.; capillary No. III) and an amine number of 0.18 mmol/g, are metered in over a period of 70 minutes at a rate such that the temperature of the reaction mixture does not exceed 75° C. The technical alkylketene dimer product has a diketene content of 85%, resulting in an alkylketene dimer:polysiloxane stoichiometry of 1.0:1.0. After the end of metering, the temperature is raised to 100° C. and stirring is continued at this temperature for an hour. Cooling to room temperature gives a β-ketocarbonyl-functional organopolysiloxane A1 in which free amine is no longer detectable (by $^1$H NMR spectroscopy).

Example 2: β-Ketocarbonyl-Functional Organosilicon Compound A2

83.3 g of the alkylketene dimer described in example 1 are reacted as in example 1 with 250 g of a mixed hydroxy-/methoxy-terminated copolymer composed of (2-aminoethyl-3-amino-propyl)methylsiloxy units and dimethylsiloxy units, with a kinematic viscosity of 977 mm2/s (25.0° C.; capillary No. IIIc) and an amine number of 0.58 mmol/g. This gives a β-keto-carbonyl-functional organopolysiloxane A2 in which free amine is no longer detectable (by 1H NMR spectroscopy).

Example 3: β-Ketocarbonyl-Functional Organosilicon Compound A3

133 g of the alkylketene dimer described in example 1 are reacted as in example 1 with 200 g of a mixed hydroxy-/methoxy-terminated copolymer composed of (2-aminoethyl-3-amino-propyl)methoxysiloxy units and dimethylsiloxy units, with a kinematic viscosity of 25 mm2/s (25.0° C.; capillary No. II) and an amine number of 2.4 mmol/g. This gives a β-ketocarbonyl-functional organopolysiloxane A3 in which free amine is no longer detectable (by $^1$H NMR spectroscopy).

Example 4: β-Ketocarbonyl-Functional Organosilicon Compound A4

114 g of the alkylketene dimer described in example 1 are reacted as in example 1 with 263 g of a polysiloxane consisting of (2-aminoethyl-3-aminopropyl)dimethylsiloxy units and dimethylsiloxy units, with a kinematic viscosity of 119 mm$^2$/s (25.0° C.; capillary No. IIc) and an amine number of 0.76 mmol/g. This gives a β-ketocarbonyl-functional organopolysiloxane A4 in which free amine is no longer detectable (by $^1$H NMR spectroscopy).

Example 5: β-Ketocarbonyl-Functional Organosilicon Compound A5

19 g of the alkylketene dimer described in example 1 are reacted in a manner as in example 1 with 358 g of a polysiloxane composed of (3-aminopropyl)methylsiloxy, trimethylsiloxy, and dimethylsiloxy units, with a kinematic viscosity of 259 mm2/s (25.0° C.; capillary No. III) and an amine number of 0.093 mmol/g. This gives a β-ketocarbonyl-functional organopolysiloxane A5 in which free amine is no longer detectable (by $^1$H NMR spectroscopy).

(Comparative) Example 6

(Noninventive) β-ketocarbonyl-functional organosilicon compound without long-chain alkyl groups (i.e., R$^3$=H)

CA6: 8.53 g of trimethyldioxinone (92.5% solution in acetone) (available from Acros), 233.92 g of a polysiloxane consisting of (3-aminopropyl)dimethylsiloxy units and dimethylsiloxy units, with a kinematic viscosity of 508 mm2/s (25.0° C.; capillary No. III) and an amine number of 0.18 mmol/g, 1.50 g of water, and 20.0 g of toluene are mixed. The mixture is heated rapidly to an internal temperature of 110-115° C. and held at this temperature for 2 hours. After cooling to room temperature, distillation is carried out at 50° C. under a reduced pressure of 10 mbar to remove toluene, water, and acetone. This gives a brown-colored β-ketocarbonyl-functional organopolysiloxane CA6 with a dynamic viscosity of 1250 mPas (at 25° C. and at a shear rate of 5 1/s), in which free amine is no longer detectable (by amine number determination).

Example 7: β-Ketocarbonyl-Functional Organosilicon Compound A7

62.9 g of a technical alkylketene dimer (available from WILMAR International Ltd under the name Wilmar AKD 1865; iodine 45.5; melting point: 51.2° C.), prepared from 65% C18 carboxylic acid, resulting in a C14/C16 alkyl radical $R^3$ are reacted as in example 1 with 290 g of a polysiloxane composed of (3-aminopropyl)methylsiloxy, trimethylsiloxy, and dimethylsiloxy units, with a kinematic viscosity of 5900 mm2/s (25.0° C.; capillary No. IV) and an amine number of 0.451 mmol/g. This gives a β-ketocarbonyl-functional organopolysiloxane A7 in which free amine is no longer detectable (by $^1$H NMR spectroscopy).

Example 8: β-Ketocarbonyl-Functional Organosilicon Compound A8

121.7 g of the alkylketene dimer described in example 7 are reacted as in example 1 with 250 g of a polysiloxane composed of (3-aminopropyl)methylsiloxy, trimethylsiloxy, and dimethylsiloxy units, with a kinematic viscosity of 7710 mm2/s (25.0° C.; capillary No. IV) and an amine number of 0.872 mmol/g. This gives a β-ketocarbonyl-functional organopolysiloxane A8 in which free amine is no longer detectable (by $^1$H NMR spectroscopy).

Example 9: β-Ketocarbonyl-Functional Organosilicon Compound A9

64.5 g of the alkylketene dimer described in example 7 are reacted as in example 1 with 250 g of a polysiloxane composed of (3-aminopropyl)methylsiloxy, trimethylsiloxy, and dimethylsiloxy units, with a kinematic viscosity of 1350 mm2/s (25.0° C.; capillary No. IIIc) and an amine number of 0.462 mmol/g. This gives a β-ketocarbonyl-functional organopolysiloxane A9 in which free amine is no longer detectable (by $^1$H NMR spectroscopy).

Example 10: β-Ketocarbonyl-Functional Organosilicon Compound A10

26.4 g of the alkylketene dimer described in example 1 are reacted as in example 1 with 250 g of a polysiloxane composed of (3-aminopropyl)methylsiloxy, trimethylsiloxy, and dimethylsiloxy units, with a kinematic viscosity of 272 mm2/s (25.0° C.; capillary No. III) and an amine number of 0.185 mmol/g. This gives a β-ketocarbonyl-functional organopolysiloxane A10 in which free amine is no longer detectable (by $^1$H NMR spectroscopy).

Example 11: (Inventive) Dispersion E1 Comprising β-Ketocarbonyl-Functional Organosilicon Compound A1

4.28 g of isotridecyl pentaethoxylate, available commercially under the tradename Lutensol TO 5 (from BASF) (HLB: 10.5), 4.74 g of an 80% aqueous solution of isotridecyl decaethoxylate, available commercially under the tradename Lutensol TO 108 (from BASF), (HLB: 13.5), and 7.48 g of fully demineralized water are charged to a metal beaker and heated to 60° C. in a drying cabinet. The mixture, which is now liquid, is homogenized using an Ultra-Turrax T 50 emulsifier (from Janke & Kunkel/IKA). Within this time, 70 g of the β-ketocarbonyl-functional organosilicon compound A1 are melted in the drying cabinet at 60° C. and added in three portions with high shearing of 6000 to 8000 rpm in such a way as to result in a preliminary dispersion in the form of a relatively firm stiff phase. Dilution is carried out with 113.5 g of fully demineralized water, heated to 60° C., in portions, with little shearing, to give the desired dispersion. The result is a milky white dispersion having an average particle size D(50) of 203 nm with a photon count rate of 253 kcps (kilocounts per second). Even after 6-month storage at room temperature or 30-day storage at 50° C., the dispersion is homogeneous and stable.

Example 12: (Inventive) Dispersion E2 Comprising β-Ketocarbonyl-Functional Organosilicon Compound A1

1.26 g of isotridecyl pentaethoxylate, available commercially under the tradename Lutensol TO 5 (from BASF) (HLB: 10.5), 8.52 g of an 80% aqueous solution of isotridecyl decaethoxylate, available commercially under the tradename Lutensol TO 108 (from BASF), (HLB: 13.5), and 6.72 g of fully demineralized water are charged to a metal beaker and heated to 60° C. in a drying cabinet. The mixture, which is now liquid, is homogenized using an Ultra-Turrax T 50 emulsifier (from Janke & Kunkel/IKA). Within this time, 70 g of the β-ketocarbonyl-functional organosilicon compound A1 are melted in the drying cabinet at 60° C. and added in three portions with high shearing of 6000 to 8000 rpm in such a way as to result in a preliminary dispersion in the form of a relatively firm stiff phase. Dilution is carried out with 113.5 g of fully demineralized water, heated to 60° C., in portions, with little shearing, to give the desired dispersion. The result is a milky white dispersion having an average particle size D(50) of 167 nm with a photon count rate of 264 kcps (kilocounts per second). Even after 6-month storage at room temperature or 30-day storage at 50° C., the dispersion is homogeneous and stable.

Example 13: (Inventive) Dispersion E3 Comprising β-Ketocarbonyl-Functional Organosilicon Compound A1

4.34 g of polyoxyethylene(4)lauryl ether, available commercially under the tradename Sympatens-ALM/040 (from Kolb) (HLB: 9.4), 3.66 g of polyoxyethylene(23) lauryl ether available commercially under the tradename Sympatens-ALM/230 (from Kolb), (HLB: 16.7), and 6.80 g of fully demineralized water are charged to a metal beaker and heated to 60° C. in a drying cabinet. The mixture, which is now liquid, is homogenized using an Ultra-Turrax T 50 emulsifier (from Janke & Kunkel/IKA). Within this time, 70 g of the β-ketocarbonyl-functional organosilicon compound A1 are melted in the drying cabinet at 60° C. and added in three portions with high shearing of 6000 to 8000 rpm in such a way as to result in a preliminary dispersion in the form of a relatively firm stiff phase. Dilution is carried out with 115.2 g of fully demineralized water, heated to 60° C., in portions, with little shearing, to give the desired dispersion. The result is a milky white dispersion having an average particle size D(50) of 180 nm with a photon count rate of 199 kcps (kilocounts per second). Even after 6-month storage at room temperature or 30-day storage at 50° C., the dispersion is homogeneous and stable.

(Comparative) Example 14: (Noninventive) Dispersion CE4 Comprising β-Ketocarbonyl-Functional Organosilicon Compound A1

9.60 g of isotridecyl hexadecaethoxylate, available commercially under the tradename Imbentin T/160 (from Kolb) (HLB: 15.6), and 3.60 g of fully demineralized water are charged to a metal beaker and heated to 60° C. in a drying cabinet. The mixture, which is now liquid, is homogenized using an Ultra-Turrax T 50 emulsifier (from Janke & Kunkel/IKA). Within this time, 70 g of the β-ketocarbonyl-functional organosilicon compound A1 are melted in the drying cabinet at 60° C. and added in three portions with high shearing of 6000 to 8000 rpm in such a way as to result in a preliminary dispersion in the form of a relatively firm stiff phase. Dilution is carried out with 116.4 g of fully demineralized water, heated to 60° C., in portions, with little shearing, to give the desired dispersion. The result is a milky white dispersion. The dispersion is not stable; after 24-hour storage at room temperature, two phases have formed.

Comparative example 14 shows that when using exclusively a nonionic emulsifier (B2) having an HLB of greater than 15, it is not possible to produce a stable dispersion.

In contrast, examples 11 to 13 (dispersions E1 to E3) show that when using at least one nonionic emulsifier (B1) having an HLB of not more than 15, storage-stable dispersions are obtained.

When using a nonionic emulsifier (B2) having an HLB of greater than 15 together with a nonionic emulsifier (B1) with an HLB of not more than 15 (as shown in example 13), as well, a stable dispersion is produced.

(Comparative) Example 15: (Noninventive) Dispersion CE5 Comprising β-Ketocarbonyl-Functional Organosilicon Compound A1

5.40 g of a 55% aqueous solution of sodium ($C_{10}$-$C_{13}$)-n-alkylbenzenesulfonate, available commercially under the tradename Disponil LDBS 55 (from BASF), 9.00 g of isotridecyl hexadecaethoxylate, available commercially under the tradename Imbentin T/160 (from Kolb) (HLB: 15.6), and 0.90 g of fully demineralized water are charged to a metal beaker and heated to 60° C. in a drying cabinet. The liquid mixture is homogenized using an Ultra-Turrax T 50 emulsifier (from Janke & Kunkel/IKA). Within this time, 70 g of the β-ketocarbonyl-functional organosilicon compound A1 are melted in the drying cabinet at 60° C. and added in three portions with high shearing of 6000 to 8000 rpm. The resulting preliminary dispersion is diluted with 113.2 g of fully demineralized water, heated to 60° C., in portions, with little shearing. The result is a milky white dispersion. The dispersion is not stable; after just an hour at room temperature, two phases have formed.

(Comparative) example 15 shows that when using a nonionic emulsifier (B2) having an HLB of greater than 15 in combination with an anionic emulsifier (B3), it is not possible to produce a stable dispersion.

Example 16: (Inventive) Dispersion E6 Comprising β-Ketocarbonyl-Functional Organosilicon Compound A1

18.2 g of a 33% aqueous solution of sodium lauryl ether sulfate, available commercially under the tradename Disponil FES 77 (from BASF) and 2.0 g of polyoxyethylene (4)lauryl ether, available commercially under the tradename Sympatens-ALM/040 (from Kolb) (HLB: 9.4) are charged to a metal beaker and heated to 60° C. in a drying cabinet. The mixture, which is now liquid, is homogenized using an Ultra-Turrax T 50 emulsifier (from Janke & Kunkel/IKA). Within this time, 70 g of the β-ketocarbonyl-functional organosilicon compound A1 are melted in the drying cabinet at 60° C. and added in three portions with high shearing of 6000 to 8000 rpm in such a way as to result in a preliminary dispersion in the form of a relatively firm stiff phase. Dilution is carried out with 109.8 g of fully demineralized water, heated to 60° C., in portions, with little shearing, to give the desired dispersion. The result is a milky white dispersion having an average particle size D(50) of 194 nm with a photon count rate of 355 kcps (kilocounts per second). Even after 6-month storage at room temperature or 30-day storage at 50° C., the dispersion is homogeneous and stable.

Example 17: (Inventive) Dispersion E7 Comprising β-Ketocarbonyl-Functional Organosilicon Compound A1

6.0 g of lauric acid, available commercially (from Merck Schuchardt), 3.9 g of an aqueous solution of potassium hydroxide (50% strength) and 2.0 g of polyoxyethylene(4) lauryl ether, available commercially under the tradename Sympatens-ALM/040 (from Kolb) (HLB: 9.4) and 6.7 g of fully demineralized water are charged to a metal beaker and heated to 60° C. in a drying cabinet. The mixture, which is now liquid, is homogenized using an Ultra-Turrax T 50 emulsifier (from Janke & Kunkel/IKA). Within this time, 70 g of the β-ketocarbonyl-functional organosilicon compound A1 are melted in the drying cabinet at 60° C. and added in three portions with high shearing of 6000 to 8000 rpm in such a way as to result in a preliminary dispersion in the form of a relatively firm stiff phase. Dilution is carried out with 110.8 g of fully demineralized water, heated to 60° C., in portions, with little shearing, to give the desired dispersion. The result is a milky white dispersion having an average particle size D(50) of 171 nm with a photon count rate of 364 kcps (kilocounts per second). The dispersion is carefully deaerated using a desiccator. Even after 6-month storage at room temperature or 30-day storage at 50° C., the dispersion is homogeneous and stable.

Examples 18 to 25: (Inventive) Dispersions E8 to E15 Comprising β-Ketocarbonyl-Functional Organosilicon Compound A2 to A5 and also A7 to A10

Dispersions E8 to E15 are produced using the same types and amounts of the emulsifier-water mixture as from example 17 (6.0 g of lauric acid, 3.9 g of an aqueous solution of potassium hydroxide (50% strength), 2.0 g of polyoxyethylene(4) lauryl ether (HLB=9.4), 6.7 g of fully demineralized water), 70 g of β-ketocarbonyl-functional organosilicon compound A2 to A5 and, respectively, A7 to A10, and also 110.8 g of water heated to 60° C.

In the case of the β-ketocarbonyl-functional organosilicon compound A2, the result is a milky white dispersion E8 having an average particle size D(50) of 177 nm with a photo count rate of 207 kcps.

In the case of the β-ketocarbonyl-functional organosilicon compound A3, the result is a milky white dispersion E9 having an average particle size D(50) of 105 nm with a photo count rate of 393 kcps.

In the case of the β-ketocarbonyl-functional organosilicon compound A4, the result is a milky white dispersion E10 having an average particle size D(50) of 153 nm with a photo count rate of 271 kcps.

In the case of the β-ketocarbonyl-functional organosilicon compound A5, the result is a milky white dispersion E11 having an average particle size D(50) of 170 nm with a photo count rate of 221 kcps.

In the case of the β-ketocarbonyl-functional organosilicon compound A7, the result is a milky white dispersion E12 having an average particle size D(50) of 248 nm with a photo count rate of 311 kcps.

In the case of the β-ketocarbonyl-functional organosilicon compound A8, the result is a milky white dispersion E13 having an average particle size D(50) of 361 nm with a photo count rate of 254 kcps.

In the case of the β-ketocarbonyl-functional organosilicon compound A9, the result is a milky white dispersion E14 having an average particle size D(50) of 182 nm with a photo count rate of 243 kcps.

In the case of the β-ketocarbonyl-functional organosilicon compound A10, the result is a milky white dispersion E15 having an average particle size D(50) of 380 nm with a photo count rate of 237 kcps.

All of dispersions E8 to E15, in which as well as an anionic emulsifier (B3) a nonionic emulsifier (B1) having an HLB of not more than 15 is used, are homogeneous and stable even after 6-month storage at room temperature or 30-day storage at 50° C.

(Comparative) Example 26

(Noninventive) Dispersion CE16 Comprising β-Ketocarbonyl-Functional Organosilicon Compound A1:

16.0 g of a 66% aqueous solution of sodium diisodecylsulfo-succinate, available commercially under the tradename Disponil SUS IC 10 from BASF, are charged to a metal beaker and heated to 60° C. in a drying cabinet. Within this time, 70 g of the β-ketocarbonyl-functional organosilicon compound A1 are melted in the drying cabinet at 60° C. and added slowly in three portions with high shearing of 6000 to 8000 rpm. This gives a preliminary dispersion which is like a lotion. It is diluted in portions with 113.5 g of fully demineralized water, heated to 60° C., with little shearing, to give the desired dispersion. The resulting dispersion is milky white with an average particle size of 869 nm. Over the course of two hours, two phases are formed. The dispersion is not storage-stable.

(Comparative) Example 27

(Noninventive) Dispersion CE17 Comprising β-Ketocarbonyl-Functional Organosilicon Compound A1:

12.2 g of a 66% aqueous solution of sodium diisodecylsulfo-succinate, available commercially under the tradename Disponil SUS IC 10 from BASF, and 4.2 g of water are charged to a metal beaker and mixed and heated to 60° C. in a drying cabinet. Within this time, 70 g of β-ketocarbonyl-functional organosilicon compound A1 are melted in the drying cabinet at 60° C. and added slowly in three portions with high shearing of 6000 to 8000 rpm. This gives a preliminary dispersion which is like a cream. It is diluted in portions with 113.6 g of fully demineralized water, heated to 60° C., with little shearing, to give the desired dispersion. The resulting dispersion is milky white, but over the course of an hour forms two phases. The dispersion is therefore not storage-stable.

(Comparative) Example 28

(Noninventive) Dispersion CE18 Comprising β-Ketocarbonyl-Functional Organosilicon Compound A1:

70 g of β-ketocarbonyl-functional organosilicon compound A1 are emulsified in the same way as described in example 17, the emulsifier charged comprising 10.74 g of a 75% aqueous solution of sodium di-2-ethylhexylsulfosuccinate, available commercially under the tradename Disponil SUS IC 875 from BASF, and 9.4 g of water.

Dilution of the preliminary dispersion with 109.9 g of water results in a milky white dispersion which, however, within an hour forms two phases. The dispersion is therefore not storage-stable.

(Comparative) Example 29

(Noninventive) Dispersion CE19 Comprising (Noninventive) β-Ketocarbonyl-Functional Organosilicon Compound CA6:

70 g of β-ketocarbonyl-functional organosilicon compound CA6 (β-ketocarbonyl-functionality with noninventive group $R^3$=H) are emulsified in the same way as described in example 18, the emulsifier charged comprising 10.74 g of a 75% aqueous solution of sodium di-2-ethylhexylsulfosuccinate, available commercially under the tradename Disponil SUS IC 875 from BASF, and 9.4 g of water.

It was not possible to produce a dispersion.

Comparative examples 26, 27, 28, and 29 show that the emulsification of β-ketocarbonyl-functional organosilicon compounds (A) using exclusively anionic emulsifiers, especially the sulfosuccinates, does not result in any storage-stable dispersions. Nor is a dispersion formed when using the noninventive β-ketocarbonyl-functional organosilicon compound CA6 (β-ketocarbonyl-functionality with noninventive group $R^3$=H). Moreover, storage-stable dispersions are not produced when the amount of emulsifier and amount of water for forming the preliminary dispersion are varied as shown in (comparative) examples 26 and 27.

Through the combination of anionic emulsifiers (B3), especially carboxylates, with nonionic emulsifiers (B1) having an HLB of not more than 15, as shown in examples 17 to 25, on the other hand, it is possible to produce storage-stable dispersions.

Example 30: Combination of the Inventive Dispersions with Amine Oil Emulsions (F')

Emulsion FE20 Comprising an Amino-Functional Organosilicon Compound (F):

9.7 g of an 80% aqueous solution of polyoxyethylene(10) isotridecyl ether, available commercially under the tradename Lutensol TO 108 (from BASF) (HLB=13.7) and 2.9 g of fully demineralized water are charged to a metal beaker. The liquid mixture is homogenized using an Ultra-Turrax T 50 disperser (from Janke & Kunkel/IKA). 70 g of a mixed hydroxy-/methoxy-terminated copolymer composed of (2-aminoethyl-3-aminopropyl)methylsiloxy units and dimethylsiloxy units, with a kinematic viscosity of 3552 mm$^2$/s (25.0° C.; capillary No. IV) and an amine number of 0.14 mmol/g, are added in three portions with high shearing of 6000 to 8000 rpm in such a way as to result in a preliminary dispersion in the form of a relatively firm stiff phase. Dilution takes place with 118.0 g of fully demineralized water in portions, with little shearing, and the resulting dispersion is stabilized with 0.3 g 80% acetic acid in water. The result is a milky white dispersion having an average particle size of 141 nm. The dispersion is carefully deaerated using a desiccator.

The inventive dispersions E7 to E15 are mixed together with the emulsion FE20, comprising an amino-functional organosilicon compound (F), in the proportions indicated in table 1. In all cases, milky white formulations result, which remain homogeneous and are storage-stable.

TABLE 1

| Example | Amount of inventive dispersion | Amount of amine oil emulsion (F') |
|---|---|---|
| 30a | 25 g E7 | 15 g FE20 |
| 30b | 13 g E8 | 27 g FE20 |
| 30c | 6 g E9 | 34 g FE20 |
| 30d | 14 g E10 | 36 g FE20 |
| 30e | 39 g E11 | 1 g FE20 |
| 30f | 25 g E12 | 16 g FE20 |
| 30g | 25 g E13 | 16 g FE20 |
| 30h | 25 g E14 | 16 g FE20 |
| 30i | 25 g E15 | 16 g FE20 |

Example 31: Use of the Inventive Aqueous Dispersions for Finishing Fibrous Substrates The formulations shown in table 1 are admixed with κ g of an aqueous solution of zirconium(IV) acetate (ZrO$_2$ content: 22 wt %). The resulting mixtures, for finishing on textiles, are diluted with water to 1 liter of liquor, and then applied as follows to sheetlike textile structures:

A DIN A4 size piece of bleached, untreated polyester-cotton poplin (65% PET, 35% CO) is used, with a basis weight of 185 g/m2.

The fabric is immersed in each case into an aqueous liquor and then squeezed off with a two-roll pad-mangle to a wet pickup of 50%, stretched out and dried in a Mathis laboratory tenter frame at 150° C. for 5 minutes. The material is thereafter conditioned for 72 hours in a conditioning chamber at 23° C. and 60% humidity, to condition it sufficiently for the purpose of determination of the hydrophobization.

After the spraying test has been carried out, the textiles are dried on a washing line in the conditioning chamber overnight.

To investigate the wash fastness properties, all of the finished textiles are washed once together with about 2 kg of ballast fabric in a MIELE Softtronic W 1935 household washing machine using the Express 20 wash program at 40° C. for 20 minutes, and spun. Added as a laundering surfactant are 5 g of a Henkel "Spee Feinwaschmittel" liquid laundry detergent. The material is subsequently dried and conditioned in the conditioning chamber for at least 12 hours at 23° C. and 60% humidity.

To remove the creasing resulting from the wash, the test specimens are ironed using a Philipps Azur 4043 iron on setting II. The swatches are then again tested for hydrophobicity by the spraying test method.

Table 2 summarizes the results of the finished textiles.

TABLE 2

| Example | Formulation from example 30 + 5 g zirconium(IV) acetate | Spray Test | Spray Test, washed |
|---|---|---|---|
| 31a | 30a | 100 | 100 |
| 31b | 30b | 100 | 90 |
| 31c | 30c | 100 | 90 |
| 31d | 30d | 100 | 90 |
| 31e | 30e | 100 | 80 |
| 31f | 30f | 100 | 90 |
| 31g | 30g | 100 | 100 |
| 31h | 30h | 100 | 95 |
| 31i | 30i | 100 | 90 |

All of the textiles finished with the formulations shown in table 2 exhibit good spraying test results (100) and also very good wash fastness properties.

Moreover, all of the textiles finished in accordance with the mandates of the working examples exhibit a pleasing soft hand.

The invention claimed is:

1. An aqueous dispersion, comprising:
   (A) one or more β-ketocarbonyl-functional organosilicon compounds which comprise at least one Si-bonded radical A of the formula $$(Si)-L^1-[X^1-L^2-]_y X^2 \quad (I)$$

where
   $L^1$ is identical or different and is a divalent, Si—C-bonded hydrocarbon radical having 1 to 18 carbon atoms,
   $L^2$ is identical or different and is a divalent hydrocarbon radical having 1 to 6 carbon atoms,
   $X^1$ is a radical of the formula —O—, —NZ—, —NR$^2$— or —S—,
   $X^2$ is a radical of the formula —O—Z, —NH—Z, —NR$^2$—Z, or —S—Z,
   Z is a radical of the formula —C(=O)—CHR$^3$—C(=O)—CH$_2$R$^3$,
   R$^2$ is a monovalent hydrocarbon radical having 1 to 18 carbon atoms,
   R$^3$ is a monovalent, optionally substituted hydrocarbon radical having at least 12 carbon atoms, y is 0, 1, 2 or 3, and
   (Si)— denotes the bond to the Si atom,
   (B1) at least one nonionic emulsifier having an HLB of not more than 15, and
   (C) water.

2. The aqueous dispersion of claim 1, wherein X$^1$ is a radical of the formula —NZ—, X$^2$ is a radical of the formula —NH—Z, R$^3$ has at least 14 carbon atoms, and y is 0 or 1.

3. The aqueous dispersion of claim 2, further comprising:
   (B2) at least one further nonionic emulsifier having an HLB of greater than 15.

4. The aqueous dispersion of claim 1, further comprising:
   (B3) at least one anionic emulsifier.

5. The aqueous dispersion of claim 1, further comprising:
   (B4) at least one cationic emulsifier.

6. The aqueous dispersion of claim 1, further comprising:
   (D) at least one nonaqueous solvent or coemulsifier.

7. The aqueous dispersion of claim 3, further comprising:
   (B3) at least one anionic emulsifier.

8. The aqueous dispersion of claim 3, further comprising:
(B4) at least one cationic emulsifier.

9. The aqueous dispersion of claim of claim 1, further comprising:
(E) one or more of pH regulators, salts, foam inhibitors, thickeners, protective colloids, preservatives, disinfectants, wetting agents, corrosion inhibitors, dyes, and/or fragrances.

10. The aqueous dispersion of claim 1, wherein one or more β-ketocarbonyl-functional organosilicon compounds (A) comprise organopolysiloxanes of the formula $$A_d R^4{}_{(3-d)} SiO(SiR_2O)_e(SiR^4AO)_f SiR^4{}_{(3-d)} A_d \quad (III),$$

where
A is a radical of the formula (I),
$R^4$ is identical or different and is a radical R or $OR^1$,
R is a monovalent, optionally substituted hydrocarbon radical having 1 to 18 carbon atoms per radical,
$R^1$ is hydrogen or an alkyl radical having 1 to 8 carbon atoms,
d is 0 or 1,
e is 0 or an integer from 1 to 2000, and
f is 0 or an integer from 1 to 20,
with the proviso that there is on average at least one radical A per molecule, meaning that, respectively,
if d is 0, f is not 0, and
if f is 0, d is 1.

11. The aqueous dispersion of claim of claim 1, comprising:
(A) at least one β-ketocarbonyl-functional organosilicon compound of the formula (I),
(B1) at least one nonionic emulsifier having an HLB of not more than 15, and
at least one further emulsifier selected from the group of
(B2) nonionic emulsifiers having an HLB of greater than 15,
(B3) anionic emulsifiers,
and mixtures of (B2) and (B3),
optionally (B4) cationic emulsifiers,
(C) water,
optionally (D) nonaqueous solvents or coemulsifiers, and
optionally (E) one or more of pH regulators, salts, foam inhibitors, thickeners, protective colloids, preservatives, disinfectants, wetting agents, corrosion inhibitors, dyes, and/or fragrances.

12. The aqueous dispersion of claim of claim 10, comprising:
(A) at least one β-ketocarbonyl-functional organosilicon compound of the formula (III),
(B1) at least one nonionic emulsifier having an HLB of not more than 15,
at least one further emulsifier selected from the group of
(B2) nonionic emulsifiers having an HLB of greater than 15,
(B3) anionic emulsifiers,
and mixtures of (B2) and (B3),
optionally (B4) cationic emulsifiers,
(C) water,
optionally (D) nonaqueous solvents or coemulsifiers, and
optionally (E) one or more of pH regulators, salts, foam inhibitors, thickeners, protective colloids, preservatives, disinfectants, wetting agents, corrosion inhibitors, dyes, and/or fragrances.

13. A method for producing an aqueous dispersion of claim 1, comprising:
mixing together
(A) at least one β-ketocarbonyl-functional organosilicon compound of the formula (I)

$$(Si)-L^1-[X^1-L^2-]_y X^2 \quad (I)$$

where
$L^1$ is identical or different and is a divalent, Si—C-bonded hydrocarbon radical having 1 to 18 carbon atoms,
$L^2$ is identical or different and is a divalent hydrocarbon radical having 1 to 6 carbon atoms,
$X^1$ is a radical of the formula —O—, —NZ—, —NR²— or —S—,
$X^2$ is a radical of the formula —O—Z, —NH—Z, —NR²—Z, or —S—Z,
Z is a radical of the formula —C(=O)—CHR³—C(=O)—CH₂R³,
$R^2$ is a monovalent hydrocarbon radical having 1 to 18 carbon atoms,
$R^3$ is a monovalent, optionally substituted hydrocarbon radical having at least 12 carbon atoms, y is 0, 1, 2 or 3, and
(Si)— denotes the bond to the Si atom,
(B1) at least one nonionic emulsifier having an HLB of not more than 15, and
(C) water,
optionally (B2) at least one further nonionic emulsifier having an HLB of greater than 15,
optionally (B3) at least one anionic emulsifier,
optionally (B4) cationic emulsifiers,
optionally (D) nonaqueous solvents or coemulsifiers, and
optionally (E) one or more of pH regulators, salts, foam inhibitors, thickeners, protective colloids, preservatives, disinfectants, wetting agents, corrosion inhibitors, dyes, and/or fragrances.

14. A method of finishing fibrous substrates, comprising contacting the fibrous substrates, with a composition comprising an aqueous dispersion of claim 1.

15. A composition comprising:
an aqueous dispersion of claim 1,
one or more amino-functional organosilicon compounds (F) or aqueous dispersions thereof,
and optionally one or more organometallic compounds (G).

16. The composition of claim 15, wherein at least one amino-functional organosilicon compound (F) comprises:
organopolysiloxanes of the formula $$Q_u R^4{}_{(3-u)} SiO(SiR_2O)_v (SiR^4QO)_w SiR^4{}_{(3-u)} Q_u \quad (X)$$

where
Q is a radical of the formula $$(Si)-L^1-[X^5-L^2-]_z X^6 \quad (VIII),$$

R is a monovalent, optionally substituted hydrocarbon radical having 1 to 18 carbon atoms per radical,
$R^1$ is hydrogen or an alkyl radical having 1 to 8 carbon atoms,
$R^2$ is a monovalent hydrocarbon radical having 1 to 18 carbon atoms,
$R^4$ is identical or different and is a radical R or $OR^1$,
$L^1$ is identical or different and is a divalent, Si—C-bonded hydrocarbon radical having 1 to 18 carbon atoms,
$L^2$ is identical or different and is a divalent hydrocarbon radical having 1 to 6 carbon atoms,
$X^5$ is a radical of the formula —NH— or —NR²—,
$X^6$ is a radical of the formula —NH₂ or —NR²H, and
(Si)— denotes the bond to the Si atom,
u is 0 or 1,
v is 0 or an integer from 1 to 2000, and
w is 0 or is 0 or an integer from 1 to 20,
z is 0, 1, 2 or 3, with the proviso that there is on average at least one radical Q per molecule, meaning that, respectively,
if u is 0, w is not 0, and
if w is 0, u is 1.

17. The composition of claim 15, wherein at least one organometallic compound (G) comprises: amines, alkoxides, carboxylic acid salts, phosphoric acid salts or chelates of metals selected from the group of Pb, Zn, Zr, Sb, Fe, Cd, Sn, Ti, Ba, Ca, Mn, V, Al, and Co.

18. The composition of claim 15, wherein at least one organometallic compound (G) comprises: butyl titanate, zirconium octoate or zirconium acetate.

19. A method for finishing fibrous substrates, comprising contacting the fibrous substrates with a composition of claim 15.

20. A method for finishing fibrous substrates, comprising contacting the fibrous substrates with a composition of claim 16.

21. A method for finishing fibrous substrates, comprising contacting the fibrous substrates with a composition of claim 17.

* * * * *